G. F. HOLLIS.
BRAKE LINING.
APPLICATION FILED OCT. 26, 1918.
1,319,001.
Patented Oct. 14, 1919.
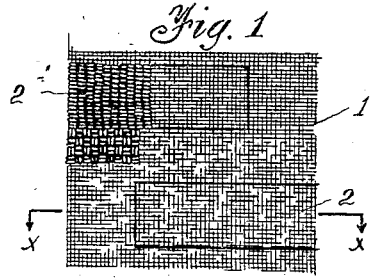
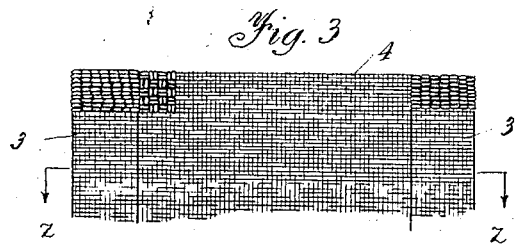
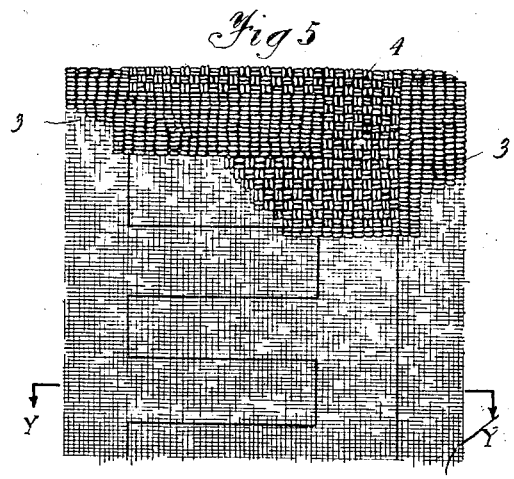
WITNESSES
INVENTOR
George Francis Hollis
By
Attorneys

UNITED STATES PATENT OFFICE.

GEORGE FRANCIS HOLLIS, OF PITTSBURGH, PENNSYLVANIA.

BRAKE-LINING.

1,319,001.

Specification of Letters Patent.   Patented Oct. 14, 1919.

Application filed October 26, 1918. Serial No. 259,824.

*To all whom it may concern:*

Be it known that I, GEORGE FRANCIS HOLLIS, a citizen of the United States, residing at Pittsburgh, in the county of Allegheny and State of Pennsylvania, have invented certain new and useful Improvements in Brake-Linings, of which the following is a specification.

This invention relates to improvements in linings for braking devices, and more particularly to that type of brakes comprising a drum and tension band.

The primary object of this invention is to provide a lining for friction brakes composed of non-combustible material such as asbestos, which is so woven and constructed as to insure an equal distribution of the lubricant to the gripping surface of the lining and thus lubricate the entire surface of the drum while in motion.

In my co-pending application, Serial No. 152,499, filed March 6, 1917, the gripping surface of the lining is formed by the corrugations extending entirely across the face of the lining, while in the improved form the raised gripping surfaces extend only partially across the face of the lining to permit the passage of the lubricant on the face of the lining from one raised portion to the other.

Other objects of this invention are to provide a brake lining of the type specified which is simple in its construction, strong, durable and efficient in its use, and inexpensive to manufacture.

To the accomplishment of these and such other objects as may hereinafter appear, the invention consists of the novel construction herein specifically described and illustrated in the accompanying drawing wherein is shown an embodiment of the invention.

In the drawing, forming a portion of this specification and wherein like numerals of reference designate corresponding parts throughout the several views: Figure 1 is a face view of the preferred form of my improved brake lining, and Fig. 2 is a cross sectional view on line x—x, Fig. 1. Figs. 3 and 5 are slightly modified forms of linings, and Figs. 4 and 6 cross sectional views on lines z—z and y—y, respectively, of Figs. 3 and 5.

Referring more in detail to the drawing there is shown in Fig. 1, the brake lining 1 provided with the transversely extending raised portions forming the gripping surfaces 2, which are arranged at regularly spaced intervals in the face of the lining 1.

The lining 1 with the raised gripping surfaces 2 are homogeneous in construction and may be fabricated from any suitable material and if desired may be reinforced by the use of wire, or the like, or if the lining is a composition it may be molded, pressed or stamped to the desired shape.

It will be noted that in my improved construction the raised gripping portions 2 do not extend transversely across the entire face of the lining 1, but only part way and in staggered relation to each other, alternately, for the purpose of permitting a free passage of the lubricant around the raised gripping portions 2.

In the modifications shown in Figs. 3 and 5, the raised gripping portions 3 extend longitudinally along the edges of the lining 3 which as shown in Fig. 5, may in addition be provided with the alternately staggered transversely extending raised gripping portions 5. The advantages of this construction in addition to those enumerated above are that it will prevent the seepage of the lubricant from the brake lining.

When rivets are used for attaching a brake lining of my improved construction to the tension band they are positioned intermediate the raised gripping portions and thus the head of the rivet will be prevented from scoring the face of the drum when the brake lining is in frictional engagement therewith.

From the foregoing description, taken in connection with the accompanying drawing, the advantages of the construction and the method of operation will be readily apparent to those skilled in the art to which the invention appertains, and while describing the principle of operation together with the device which is now considered to be the best embodiment thereof, it is to be understood that the device shown is merely illustrative and that various changes in the form, proportion and the minor details of construction may be resorted to without departing from the principle or sacrificing any of the advantages of the invention as defined in the appended claims.

What I claim as new and desire to secure by Letters Patent is:

1. A brake lining woven of homogeneous material, and provided with raised wearing portions extending partially across the face of the brake lining and positioned in staggered relation with respect to each other, as shown and described.

2. As an article of manufacture, a brake lining having alternately staggered raised gripping surfaces extending partially across the face of the brake lining, the entire lining being homogeneous.

3. As an article of manufacture, a brake lining woven of homogeneous material having raised gripping surfaces extending longitudinally along the edge of the lining and raised gripping surfaces alternately staggered and extending transversely across a portion of the face of the brake lining.

In testimony whereof I affix my signature in the presence of two witnesses.

GEORGE FRANCIS HOLLIS.

Witnesses:
JENNIE JONES,
R. CLEMENT WEBER.